Patented Jan. 23, 1934

1,944,588

UNITED STATES PATENT OFFICE 1,944,588

PROCESS FOR JAPANNING ON CONCRETE SURFACES

Sotojiro Asobe, Kanazawashi, Japan

No Drawing. Application September 13, 1930, Serial No. 481,805, and in Japan April 2, 1930

5 Claims. (Cl. 91—68)

This invention relates to a process of japanning on concrete surfaces characterized by the combination of the first step of providing a surface of concrete; the second step of applying a coat of a prepared mixture of raw japan, asphalt, "jinoko" (which designates in this art in Japan a fine powder of burnt clay, which is prepared by burning and baking clay material and then grinding or milling the same) and "tonoko" (i. e. a fine powder of clay slate which is prepared by grinding or milling clay slate and subsequently levigating the same) as the intermediate layer; the third step of applying a coat of a prepared mixture of raw japan and "jinoko" or "tonoko" or both of the last mentioned as the surface layer and the fourth and final step of applying a finishing layer of japan. The present invention has for its object to produce upon concrete surfaces, highly durable and extremely fine japan finishes, the same being highly desirable for various articles, and particularly for the surfaces of buildings, and the like, because the present finish is free of any possibility of corrosion or tendency to peel when subjected to alkaline substances contained in the concrete itself.

According to the known process usually adopted for wood surfaces, it is practically impossible to apply a japan lacquer coating of the same type to the surfaces of concrete wares or concrete buildings, the lacquer layer being subject to corrosion, because of the alkaline substances contained in the concrete and which causes the coating to separate from the surface. This seems to be due to the formation of calcium japonate, aluminium japonate, etc., which are not plastic in themselves and have no power to acting as a binding for the other elements, between the concrete surface and the japan layer when subjected to the action of alkaline substances, contained in the concrete, upon japonic acid, the main constituent of japan.

In accordance with the present invention, the surface is prepared of concrete, and when it has properly set, the prepared mixture of raw japan, asphalt, "jinoko" and "tonoko" is applied as a coating onto the surface and forms an intermediate layer, and thereafter, the preparation consisting of a mixture of raw japan and "jinoko" or "tonoko" or a mixture of these three substances is applied as a coating to the surface of the first layer, the finishing layer of japan being then applied. Each layer, after being applied, is preferably followed by repeated drying and polishing operations. A more detailed explanation of the several steps of the present invention is given in the following example.

The surface to be japanned is allowed to set for approximately one month before the japanning material is applied to the surface. The japanning material is prepared by mixing 100 parts of a mixture containing "jinoko" and "tonoko" in equal quantities and kneading the mixture with some water together with the mixture of 20 parts of raw japan and 50 parts of molten asphalt. After the coating has become dry, the surface thereof is polished to an even finish, the coating, drying and polishing being repeated at least twice in the same manner, whereupon a kneaded mixture containing 60 parts of raw japan, 50 parts of "jinoko" and 50 parts of "tonoko" is then applied, dryed and polished, the coating, drying and polishing being repeated again. Then a kneaded mixture of 60 parts of raw japan and 100 parts of "tonoko" is applied, dryed and polished, after which the three steps are repeated again, and finally japan is applied, dryed and polished three times to produce the final finish. The surfaces of the wares or buildings thus finished will stand up for a long period of years.

When japan is applied to a concrete surface in accordance with the present invention, calcium japonate, aluminium japonate, and the like may also be formed between the surface and the intermediate layer, but the quantity thus formed is so small and so finely divided into particles containing asphalt, etc. that the particles do not cause separation of the intermediate layer. Asphalt, the chief constituent of which is hydrocarbon and the like, protects the coating layer against corrosion from the alkaline substances in the concrete and adheres to the porous concrete surface together with the raw japan and "jinoko", which is coarse and gives hardness to the coating, as well as to the "tonoko", which is a very fine powder, giving compactness and strength to the coating. There can be no sudden change in either the chemical composition or the physical constitution of the layers, because the successive layers lack asphalt, "jinoko" and "tonoko" but contain japan. Consequently, according to the present invention, the massive and elaborate japanese coatings, which are neither subject to corrosion nor changes in composition may be obtained, and this has been found to be especially desirable in iron reenforced concrete buildings of Buddhist temples, etc., the use of such construction having heretofore been impossible because of perfect japanese lacquer work which would not take on concrete surfaces.

The present invention is equally applicable and effective in cases where the surface to be japanned is motar, plaster, stucco and the like.

Having now particularly described and ascertained the nature of my said invention, and in what manner the same is to be performed, I declare that what I claim is:—

1. The process of japanning concrete surfaces, which consists in applying a ground layer of material comprising a mixture of raw japan, asphalt, jinoko and tonoko, thereafter applying a second layer comprising a mixture of raw japan and jinoko, and finally applying a finishing layer of japan.

2. The process of japanning concrete surfaces, as claimed in claim 1, in which the said second mixture to be applied includes tonoko.

3. The process of japanning concrete surfaces, which consists in applying a ground layer of material comprising 100 parts of a mixture containing equal parts of jinoko and tonoko combined in the presence of water, 20 parts of raw japan, 50 parts of molten asphalt, then applying a second layer consisting of a mixture of 60 parts of raw japan and 50 parts of jinoko, thereafter applying a third coating comprising 60 parts of raw japan and 100 parts of tonoko, and finally applying a finishing layer of japan.

4. The process of japanning concrete surfaces, as claimed in claim 1, including the step of first drying and then polishing each coating before applying the next coating.

5. The process of japanning concrete surfaces, as claimed in claim 3, including the step of first drying and polishing each coating before applying the next coating.

SOTOJIRO ASOBE.